(12) United States Patent
Wyllie

(10) Patent No.: US 9,007,533 B2
(45) Date of Patent: Apr. 14, 2015

(54) MOVING DISPLAY SYSTEM

(76) Inventor: Stephen Wyllie, Bala (CA)

( * ) Notice: Subject to any disclaimer, the term of this patent is extended or adjusted under 35 U.S.C. 154(b) by 820 days.

(21) Appl. No.: 13/247,487

(22) Filed: Sep. 28, 2011

(65) Prior Publication Data

US 2013/0076993 A1 Mar. 28, 2013

(51) Int. Cl.
*H04N 5/64* (2006.01)
*G06F 1/16* (2006.01)
*G09F 19/02* (2006.01)
*G09F 23/06* (2006.01)
*H04N 5/655* (2006.01)
*A47F 10/02* (2006.01)

(52) U.S. Cl.
CPC .............. *G06F 1/1601* (2013.01); *G09F 19/02* (2013.01); *G09F 23/06* (2013.01); *H04N 5/655* (2013.01); *A47F 10/02* (2013.01)

(58) Field of Classification Search
CPC ....... G06F 1/1601; G09F 19/02; G09F 23/06; H04N 5/655; A47F 10/02
USPC ......................................................... 348/836
See application file for complete search history.

(56) References Cited

U.S. PATENT DOCUMENTS

| | | |
|---|---|---|
| 3,006,094 A | 10/1961 | La Monte |
| 3,140,874 A | 7/1964 | Jensen et al. |
| 3,221,666 A | 12/1965 | Wengel |
| 3,231,995 A | 2/1966 | Anthony |
| 3,331,153 A | 7/1967 | Woods |
| 3,735,513 A | 5/1973 | Constant, Jr. et al. |
| 3,849,918 A | 11/1974 | Mazzocco, Sr. |
| 4,480,157 A | 10/1984 | Ishikura et al. |
| 4,638,445 A | 1/1987 | Mattaboni |
| 4,892,980 A | 1/1990 | Riley |
| 4,984,523 A | 1/1991 | Dehne et al. |
| 5,687,499 A | 11/1997 | Brnjac |
| 5,703,564 A | 12/1997 | Begum et al. |
| 6,108,954 A | 8/2000 | Eiteneer et al. |
| 6,701,650 B1 | 3/2004 | Cieciuch et al. |

(Continued)

FOREIGN PATENT DOCUMENTS

| | | |
|---|---|---|
| GB | 8711 A1 | 0/1914 |
| GB | 2371850 A | 8/2002 |

OTHER PUBLICATIONS

News America Marketing, SmartSource ShelfVision Video, http://www.newsamerica.com/productsandservices/instore/Pages/shelfvisionvideo.aspx, Jun. 8, 2011.

(Continued)

*Primary Examiner* — Allen Wong
(74) *Attorney, Agent, or Firm* — Millman IP Inc.

(57) ABSTRACT

In one aspect, the invention is directed to a moving display system that includes a track member support, a track member held by the track member support, and having a first end and a second end, and a display member support. The display member support includes a body, wherein the body is configured to hold a display member, a motor, a wheel that is drivable by the motor to move the display member support along the track member, a sensing system, and a controller that is operatively connected to the motor. The controller receives signals from the sensing system and is programmed to, in at least some instances:

a) determine using the signals when the display member support reaches one of the first and second ends of the track member, and
b) change the direction of rotation of the motor based on the determination made in step a).

15 Claims, 7 Drawing Sheets

(56) References Cited

U.S. PATENT DOCUMENTS

| | | |
|---|---|---|
| 7,069,681 B2 | 7/2006 | Noble et al. |
| 7,624,684 B2 | 12/2009 | Morris |
| 7,845,101 B2 | 12/2010 | Padiak et al. |
| 2005/0205310 A1 | 9/2005 | Pelz |
| 2007/0101627 A1 | 5/2007 | Gutierrez Lomelin |
| 2010/0121693 A1 | 5/2010 | Pacana |
| 2010/0185501 A1 | 7/2010 | Chou et al. |
| 2010/0308769 A1 | 12/2010 | Baba |

OTHER PUBLICATIONS

PCT/CA2012/000903, International Search Report, Jan. 15, 2013.

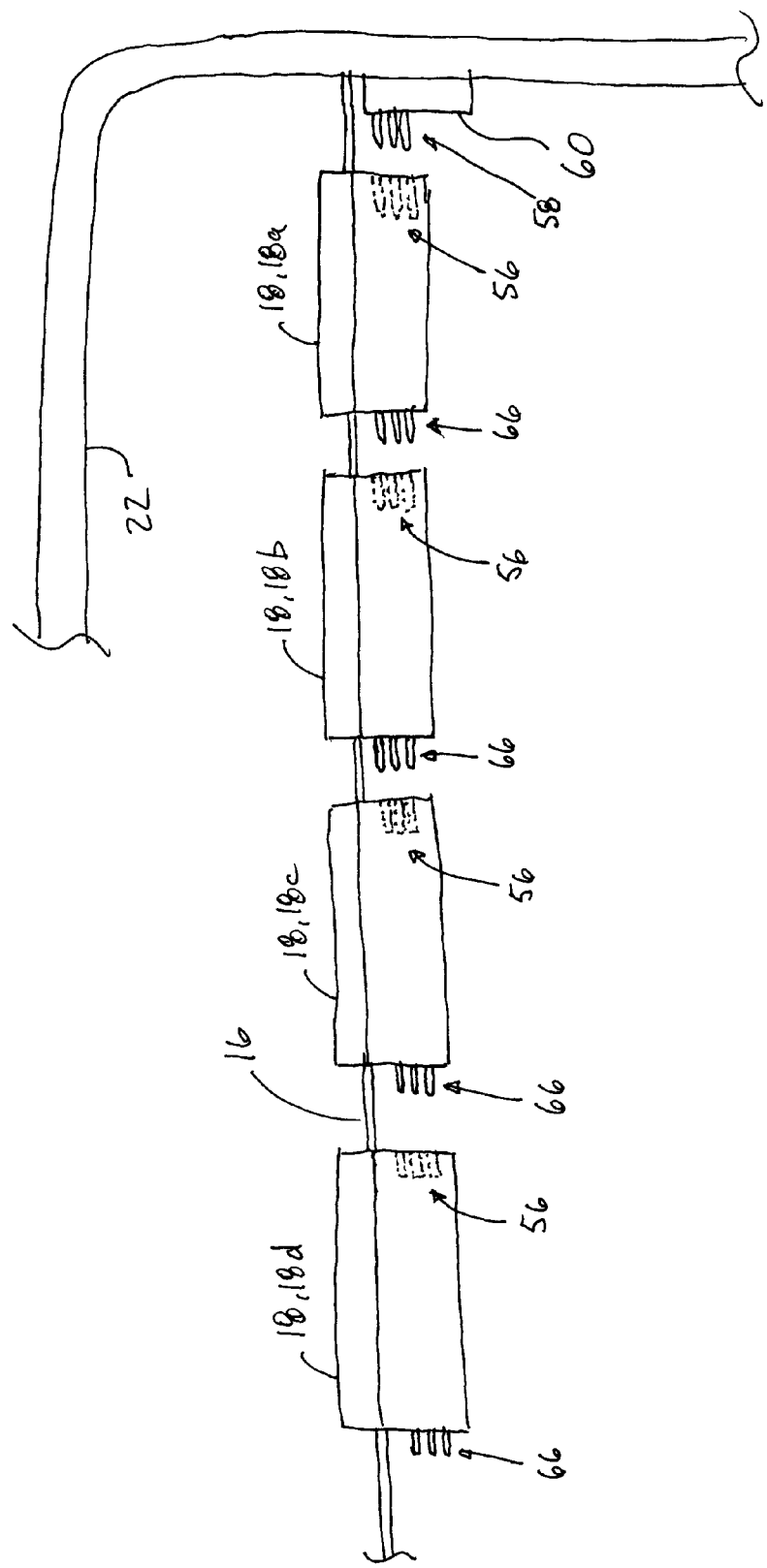

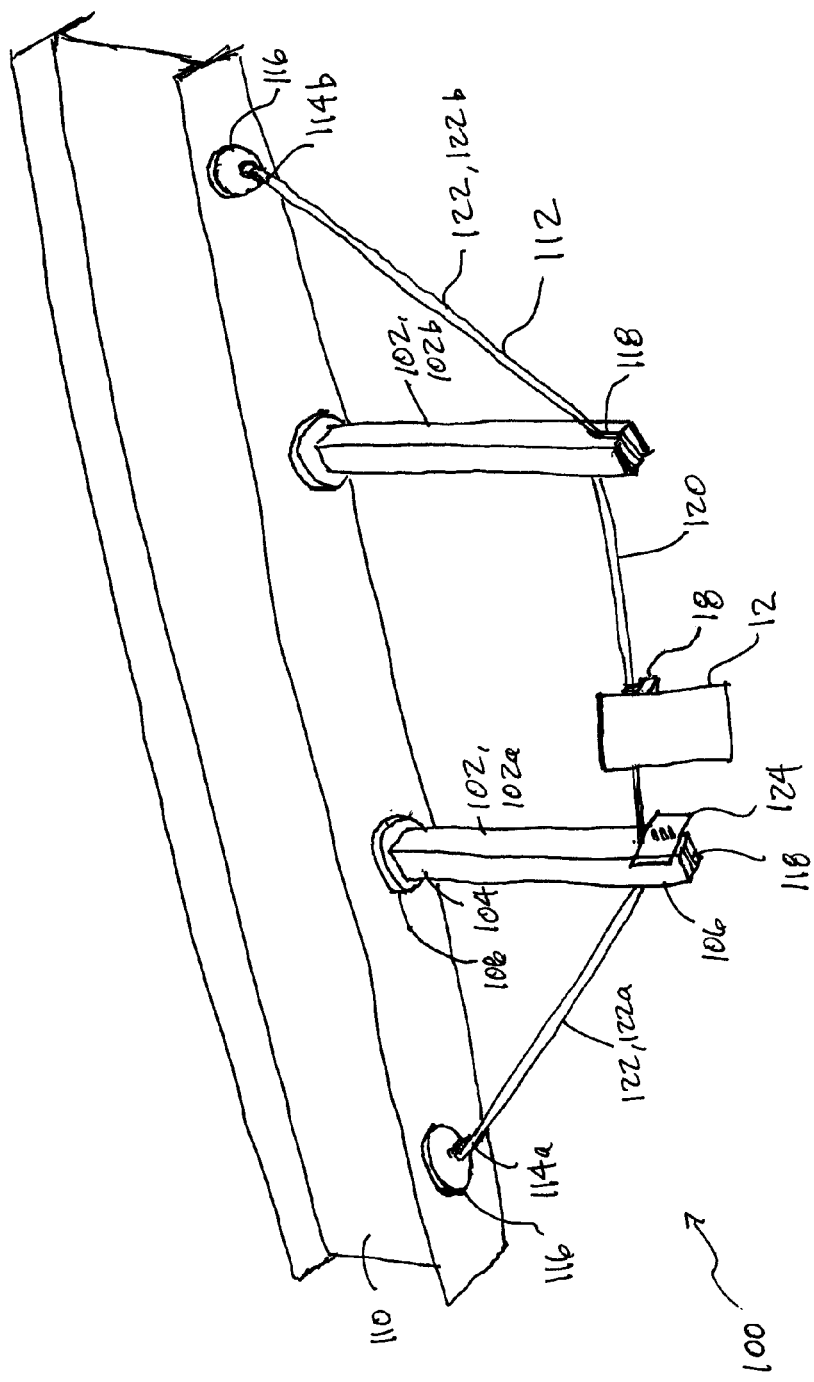

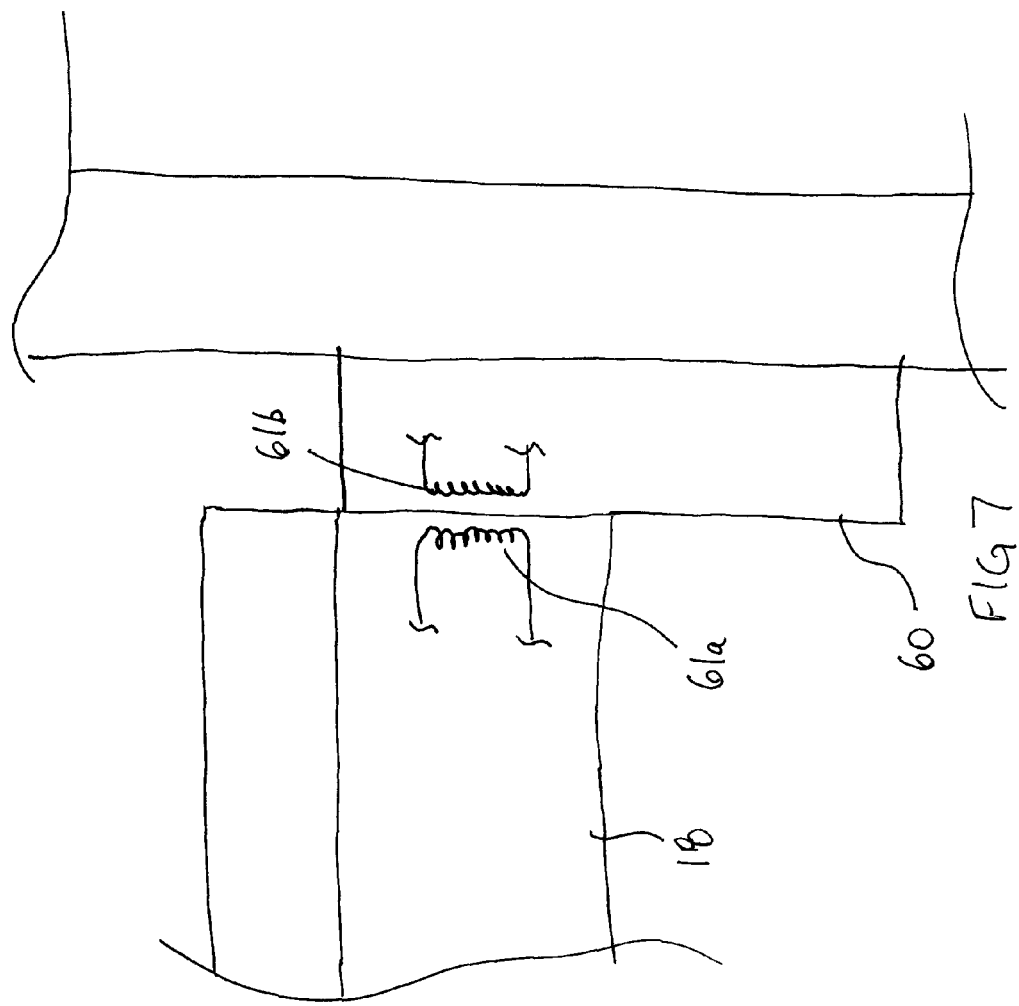

MOVING DISPLAY SYSTEM

FIELD OF THE INVENTION

The present invention relates to moving displays and particularly moving displays for advertising products for sale.

BACKGROUND OF THE INVENTION

It is known to provide a moving display for the purpose of advertising products or services for sale. However such displays are typically expensive, difficult to install, complex and prone to failure. There is a need for a moving display system that is simple, easy to install, inexpensive, and yet reliable.

SUMMARY OF THE INVENTION

In one aspect, the invention is directed to a moving display system that includes a track member support, a track member held by the track member support, and having a first end and a second end, and a display member support. The display member support includes a body, wherein the body is configured to hold a display member, a motor, a wheel that is drivable by the motor to move the display member support along the track member, a sensing system, and a controller that is operatively connected to the motor. The controller receives signals from the sensing system and is programmed to, in at least some instances:
  a) determine using the signals when the display member support reaches one of the first and second ends of the track member, and
  b) change the direction of rotation of the motor based on the determination made in step a).

In one embodiment, the sensing system includes a first sensor for detecting the first end of the track member and a second sensor for detecting the second end of the track member. The sensors are preferably infrared sensors and more preferably time of flight sensors.

In another embodiment, the moving display system includes an energy storage device for powering the controller and the motor. When the controller determines that the energy storage device has more than a selected amount of charge, the controller is programmed to carry out steps a) and b). When the controller determines that the energy storage device has less than the selected amount of charge, the controller is programmed to drive the display member support to a charging station and charge the energy storage device by connecting the energy storage device to an external source of power.

In another aspect, the invention is directed to a moving display system that includes a track member support, a track member held by the track member support, and having a first end and a second end, and a plurality of display member supports, including a first display member support and a second display member support. Each display member support includes a body, wherein the body is configured to hold a display member, a motor, a wheel that is drivable by the motor to move the display member support along the track member, a sensing system, and a controller that is operatively connected to the motor. The controller receives signals from the sensing system, and is programmed to, in at least some instances:
  a) determine using the signals when the display member support either reaches one of the first and second ends of the track member or comes into proximity to the other display member support, and
  b) change the direction of the motor based on the determination made in step a).

BRIEF DESCRIPTION OF THE DRAWINGS

The present invention will now be described by way of example only with reference to the attached drawings, in which:

FIG. 5 is an elevation view of a moving display system in accordance with another embodiment of the present invention;

FIG. 6 is a perspective view of a track structure that may be used with the moving display system instead of the track support shown in FIG. 1; and FIG. 7 is a side view of an alternative structure for charging an energy storage member in the moving display support shown in FIG. 2.

DETAILED DESCRIPTION OF THE INVENTION

Figure 1:
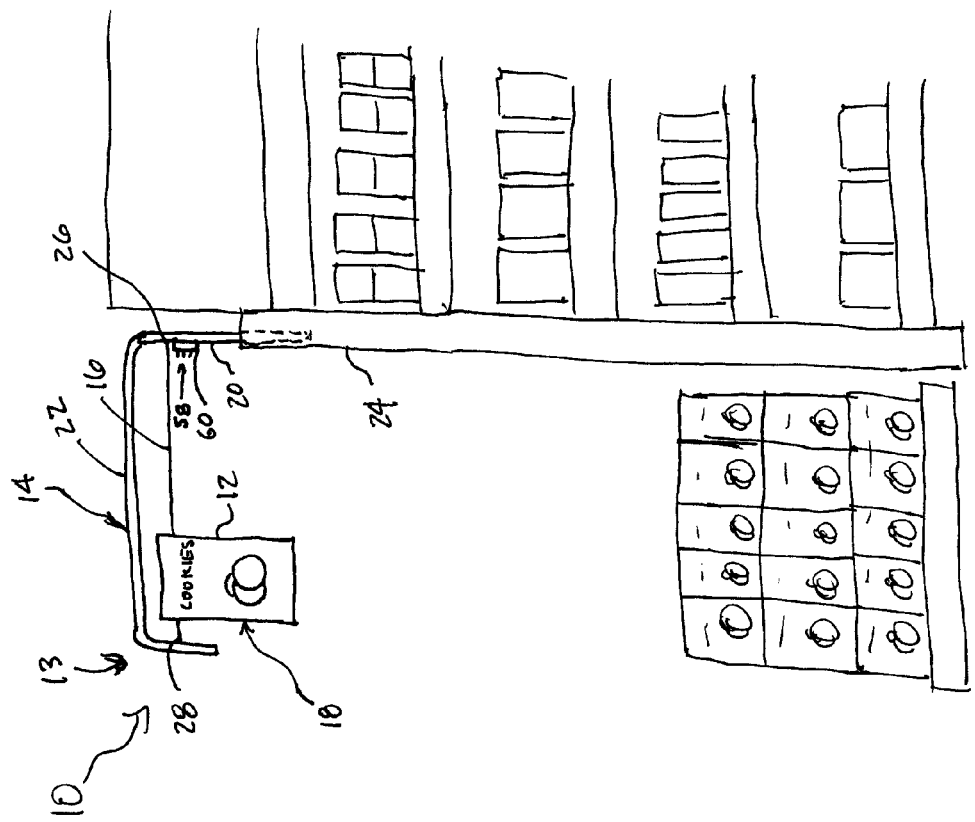
FIG. 1 is an elevation view of a moving display system in accordance with an embodiment of the present invention.
Figure 1:
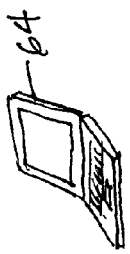

Reference is made to FIG. 1, which shows a moving display system 10 that may be used for displaying media on a display member 12 while moving it so as to make it more eye-catching to passersby. The moving display system 10 includes a track structure 13 which includes a track member support 14 and a track member 16, and a display member support 18 that is configured to hold the display member 12. The track member support 14 may have any suitable structure. For example the track member support 14 may be made up of a single metallic rod that has a base portion 20 and a track member holding portion 22. The base portion 20 is used for mounting the track member support 14 to some structure. For example in the embodiment shown in FIG. 1, the base portion 20 is sized to be mounted in and captured by a shelf support member 24 in a supermarket or department store. The track member holding portion 22 supports the track member 16.

The track member 16 supports the display member support 18 thereon and permits the movement of the display member support 18 thereacross. The track member 16 may have any suitable structure. For example, the track member 16 may be a flexible member or a semi-rigid member, such as a cable, a wire, a length of string, a length of rope of either stranded or solid natural or synthetic material. Alternatively the track member 16 may be a rigid member made from, for example, metal rod or tubing. As yet another alternative, the track member 16 may be a combination of flexible and rigid members. The track member 16 has a first end 26 and a second end 28.

The display member 12 may be any suitable type of display member 12. For example, the display member 12 may be made from paper or a polymeric material with a fixed printed image thereon. Alternatively, the display member 12 may be an electronic display member which can display still images and video. There are many suitable types of electronic display member that may be used for the display member 12, such as for example, an LCD screen, an LED screen, an OLED screen, a plasma screen or e-paper. The display member 12 may further include a plurality of individual lamps (e.g. LEDs) that can selectively be lit at selected times so as to draw attention to the display member 12 to passersby. As another alternative, the display member 12 may include an audio output device (e.g. a speaker) that can selectively be activated to draw attention to the display member 12 to passersby.

The display member support 18 moves across the track member 16 between the first and second ends 26 and 28. The display member support 18 may be completely untethered while moving on the track member 16, which provides a cleaner appearance for the display member support 18 as compared to tethered devices, and which also eliminates problems with tangling of power cables during movement of the display member support 18.

Figure 2:
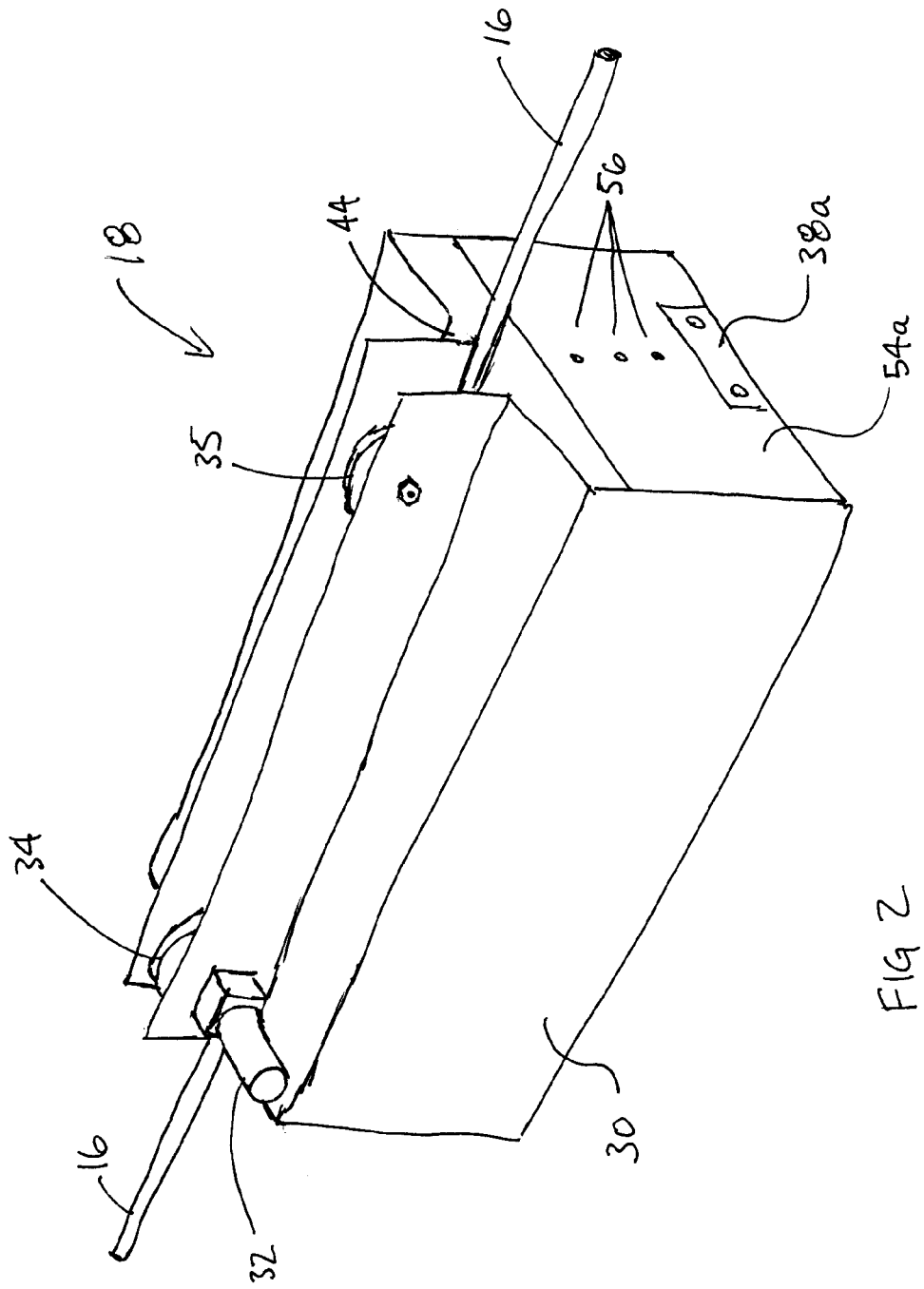
FIG. 2 is a magnified perspective view of a display member support that is part of the moving display system shown in FIG. 1.

Referring to FIG. 2, the display member support 18 includes a body 30, a motor 32 (which is, in the embodiment shown, a bidirectional motor), a first wheel 34 that is driven by the motor 32, a second wheel 35, a controller 36 for controlling the operation of the motor 32, a sensing system 38 that is used to assist the controller in determining the position of the display member support 18, and an energy storage device 40. The body 30 may be made from sheet metal or any other suitable (preferably lightweight) material and houses or supports the other components that make up the display member support 18. The motor 32 may be mounted to an exterior surface of the body 30 and has an output shaft that passes through an aperture in the body 30 and supports the first wheel 34 thereon. The first wheel 34 is therefore rotated by the motor 32, which drives the display member support 18 along the track member 16 in one direction or the other. The first wheel 34 and the second wheel 35 may have any suitable shape. Preferably they have a shape that helps to retain them on the track member 16. In the embodiment shown, the first and second wheels 34 and 35 each have a peripheral groove thereon which straddles the track member 16, which is a cable in the embodiment shown.

Figure 3:
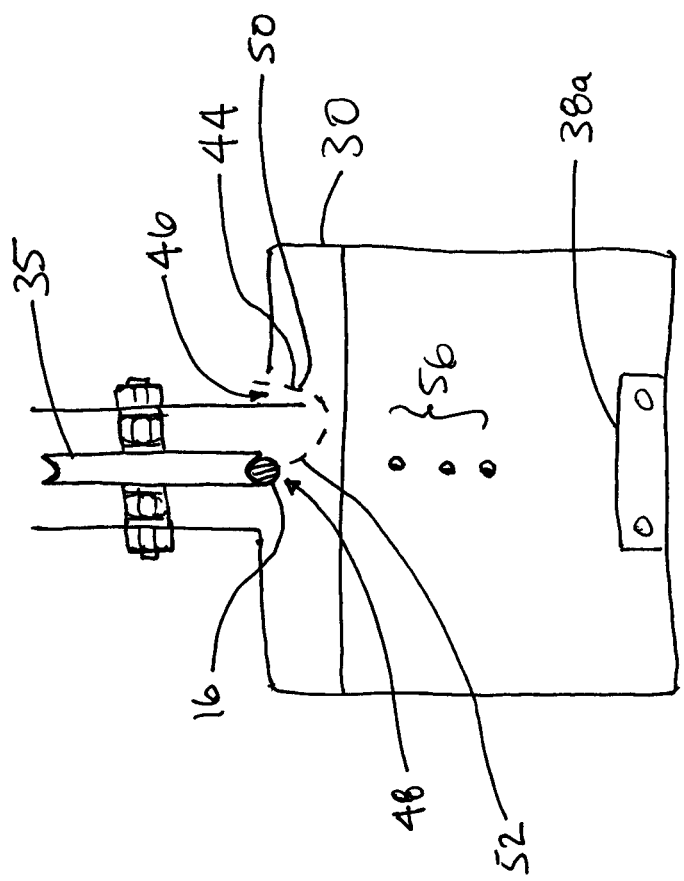
FIG. 3 is an end view of the display member support shown in FIG. 2.

The first and second wheels 34 and 35 may be substantially in line so as to inhibit the display member support 18 from tipping in its direction of travel while accelerating or decelerating. The display member support 18 may have a center of gravity shown at Cg (FIG. 3) that is below (preferably directly below) the first and second wheels 34 and 35 so that the display member support 18 is stable while on the track member 16. The body 30 has a longitudinally extending slot 44 that is an installation path for the track member 16 when mounting the display member support 18 on the track member 16. Throughout this disclosure the slot 44 may be referred to as the installation path 44 where appropriate. The installation path 44 is more clearly shown in the form of a dashed line in FIG. 3. The installation path 44 extends generally laterally (albeit not directly laterally) from an opening 46 to an endpoint 48 which is at the undersides of the first and second wheel 34 and 35. As can be seen in FIG. 3, the installation path 44 includes a vertical drop shown at 50 and a vertical rise shown at 52 in the direction of travel of the track member 16 along the installation path 44 to the endpoint 48 (i.e. when installing the display member support 18 on the track member 16). In other words, as the track member 16 moves through the installation path, it initially drops down at least by some amount vertically relative to the display member support 18 and then near the end of the installation path 44 it rises by some amount vertically to reach the endpoint 48. As a result of this rise near the end of the path 44, the display member support 18 is inhibited from falling to the ground in the event that the wheels 34 and 35 leave the track member 16 inadvertently. Also, as can be seen in FIG. 3, the path 44 is blind in the sense that there is no other route for the track member 16 to leave the body 30 of the display member support 18, other than through the opening 46.

The sensing system 38 includes a first sensor 38a at a first longitudinal end 54a of the display member support 18 and a second sensor 38b at a second longitudinal end. The sensing system 38 detects when the display member support 18 has reached an end 26 or 28 of the track member 16, and sends a signal to the controller 36 notifying it of this event. The sensors 38a and 38b may be any suitable type of sensors, such as, for example, infra-red time-of-flight sensors. The sensors 38 and/or the controller 36 may be capable of adjusting the distance from the ends 26 and 28 at which the controller 36 reverses rotation of the motor 32. In one embodiment, the sensors 38a and 38b may be physically moved to desired positions on the body 30 of the display member support 18 so as to change the distance from the body 30 to the end 26 or 28 at which the controller 36 reverses the motor 32. In another embodiment, the adjustment of the distance may be carried out electronically. For example, if the sensors 38 are of the type that send a variable signal to the controller 36 that is indicative of the distance to the end 26 or 28, then the programming of the controller 36 may permit the selection of a new distance value at which it will reverse direction of the motor 32. Alternatively, if the sensors 38 only send a simple on/off type signal when an end 26 or 28 is detected, then the controller 36 can have an adjustable delay period before it reverses the motor 32 as part of its programming so it can vary the distance to the end 26 or 28 before reversal of the motor 32 is carried out.

While non-contact sensors are shown and described, it is alternatively possible to use contact sensors for the sensing system, which would contact the track member support 14 to generate a signal which would indicate to the controller 36 to reverse the motor 32.

In an alternative embodiment, the sensing system 38 may use different kinds of sensors and may operate differently. For example, the sensing system 38 may incorporate a single Hall effect sensor that counts rotations of the wheel 34, and the controller 36 may be programmed to determine when the display member support 18 has reached the end of the track member 16 after a selected number of rotations of the wheel 34.

The energy storage device 40 stores energy for powering the controller 36, the motor 32 and the sensing system 38 if need be. The energy storage device 40 may be any suitable type of device, such as, for example, a rechargeable battery. In embodiments wherein the energy storage device 40 is rechargeable, the display member support 18 may include a first connector 56 that mates with a second connector 58 on a charging station 60 that is at one of the ends 26 or 28 of the track member 16. In the embodiment shown, the first connector 56 is female and includes three apertures, while the second connector 58 is male and includes three prongs. It will be understood that the first connector could be male and the second connector could be female, or alternatively some other arrangement could be provided.

The controller 36 receives signals from the sensing system 38 and controls the operation of the motor 32 based on them, and based on other factors such as the state of charge of the energy storage device 40. The controller 36 may be programmed as follows: When the controller 40 determines that the energy storage device 40 has more than a selected amount of charge, the controller is programmed to:
a) determine using the signals when the display member support 18 reaches one of the first and second ends 26 and 28 of the track member 16, and b) change the direction of rotation of the motor 32 based on the determination made in step a), so that the display member support 18 begins travelling along the track member 16 in the opposite direction, towards the other end 26 or 28. Thus, the display member support 18 may reciprocate from one end 26 or 28 to the other.

In an embodiment, the controller 36 may be programmed to cause the display member support 18 to appear to shake, so as to assist in getting the attention of passersby. To achieve this the controller 36 may repeatedly reciprocate the motor 32 at least a selected frequency without translating significantly along the track member 16. In such an embodiment, the display member support 18 may include a motion sensor (not shown) to detect when a person is passing nearby which would be used to trigger the controller 36 to initiate the shaking of the display member support 18. After a shaking event has taken place, the controller 36 may be programmed to not permit another shaking event to take place for a selected period of time (e.g. 20 seconds).

When the controller 36 determines that the energy storage device 40 has less than the selected amount of charge, the controller 36 may be programmed to drive the display member support 18 to the charging station 60 and charge the energy storage device 40 by connecting the energy storage device 40 to an external source of power.

The controller 36 may determine whether the energy storage device 40 has sufficient charge by any suitable means. For example, the controller 36 may count the number of times that the display member support 18 has gone back and forth on the track member 16. This can be accomplished by counting the number of times that the sensors 38 have tripped. In an embodiment, for example, the controller 36 may be programmed to direct the display member support 18 to plug in to the charging station 60 to recharge the energy storage device 40 after the sensors 38 have tripped a selected number of times. The selected number of times may be adjustable. In an alternative embodiment, the controller 36 may determine whether the energy storage device 40 has sufficient charge by measuring the charge in the energy storage device 40. In yet another alternative embodiment, the controller 36 may determine whether the energy storage device has sufficient charge simply by measuring the amount of time that has elapsed since the previous charging cycle. In such an embodiment, the clock that is used to measure elapsed time would be considered the sensing system.

In order to charge the energy storage device 40, the controller 36 drives the motor 32 to rotate in the direction to bring the display member support 18 to the charging station 60 at which point the first and second connectors 56 and 58 engage each other. Upon engagement of the connectors 56 and 58, the controller 36 detects a voltage, at which point it continues to drive the motor 32 in an attempt to bring the first and second connectors 56 and 58 into full engagement with each other.

Instead of having first and second (male and female) connectors 56 and 58 that must mate together, the display member support 18 and the charging station 60 may be configured to charge the energy storage device 40 via magnetic inductance. In such an embodiment, the charging station 60 and the display member support 18 would each have an induction coil (which are individually identified as first induction coil 61*a* and second induction coil 61*b* in FIG. 7). When the display member support 18 requires charging, it would be driven towards the charging station 60 so that the induction coils 61*a* and 61*b* would be in sufficient proximity to one another so that energy transfer to the energy storage member 40 could take place. Any suitable inductive charging circuits known in the art of charging energy storage members (e.g. rechargeable batteries) may be used in the charging station 60 and the moving display support 18. In the embodiment shown in FIG. 7, the display member support 18 could simply be driven until it contacts the charging station 60. This is a simpler arrangement in the sense that it would not require the level of alignment that is required for insertion of male connectors 56 into female connectors 58, and would also not require the motor 32 to drive the moving display support 18 with sufficient force to overcome the resistance that would exist to the insertion of the male connectors 56 into the female connectors 58.

When the moving display support 18 is brought to the charging station 60 (and in particular in embodiments where male and female connectors 56 and 58 are used), if by the end of a selected period of time (e.g. 8 seconds) the controller 36 does not detect a sufficiently high voltage, then the controller 36 may reverse the motor 32 so as to bring the display member support 18 out of engagement with the charging station 60 and may then try again, reversing the motor 32 again to drive the display member support 18 back into engagement with the charging station 60. If after a selected number of tries, the controller 36 does not measure a sufficient voltage, then the controller 36 may determine that there is a problem and may take some suitable action. For example, the controller 36 may signal that a problem exists by illuminating a lamp (e.g. an LED) on the display member support 18 so as to indicate to store employees that a problem exists. Alternatively or additionally, the display member support 18 may be equipped with a wireless communication device 62 that is used by the controller 36 to send a wireless signal to a remote device 64 (FIG. 1) that there is a problem. The wireless communication device 62 may be any suitable type of device. For example, if the remote device 64 is located within the same store in which the moving display system 10 is installed, then the wireless communication device 62 may be a Wi-Fi network adapter. Alternatively, if the remote device 64 is located in some other place (e.g. in a different building entirely, in the same city, or in a different city for example), then the wireless communications device 62 may be a cellular network adapter. By signaling the remote device 64 that there is a problem, a service person can come to correct the problem quickly, so that the system 10 is not left inoperative for a long period of time.

In addition to indicating to a remote device 64 that a charging problem has occurred, the controller 36 can use the wireless communications device 62 to indicate that other types of problem have occurred, such as a situation where the energy storage device 40 has so little charge that the display member support 18 cannot be driven to the charging station 60, or a situation where the motor 32 is inoperative for some reason.

In addition to using the wireless communications device 62 to indicate to a remote device 64 that a problem has occurred, the wireless communications device 62 can be used to receive commands from the remote device 64. For example, a revised control program may be uploaded to the controller 36 in order to change how the controller 36 operates the display member support 18. As an example, for a particular type of product, it may be desired to replace a control program in which the display member support 18 simply moved back and forth repeatedly between the ends 26 and 28 of the track member 16, with a program wherein the controller 36 causes the display member support 18 to shake at some regular interval to attract attention. Additionally or alternatively, in embodiments wherein the display member 12 is an electronic display member, the wireless communications device 62 may be used to receive new media to display on the display member 12. For example, a store may use the moving display system 10 to display images of a particular brand of cookies for a selected period of time (e.g. a week). At some point a decision may be made to push the sales of a different product (e.g. cereal), and so a cereal image may be uploaded to the controller memory for display on the display member 12.

In embodiments where a wireless communications device 62 is provided, it would be possible for the wireless communications device 62 to be used to communicate in a limited way with personal devices, such as smartphones, tablet computers or the like. Optionally, the controller 36 could permit control of its programming only to authorized persons (e.g. service personnel), or in a limited way to passersby. For example, it could act on commands from passersby or could communicate with passersby by shaking, emitting sounds, displaying particular messages on the display member 12, or any other suitable way.

In an embodiment it is possible to provide one or more non-powered display member supports that may be connected to the powered display member support 18, and which may be used to hold separate display members, or a portion of a large display member that is in part held by the powered display member support 18. In such an embodiment care is to be taken to ensure that the sensing system 38 is not obstructed by the non-powered display member supports, or that electrical current can be routed through to sensors on the non-powered display member supports that would then be part of the sensing system 38.

In an embodiment, the charging station 60 draws power from the electrical power supply in the location in which it is installed (e.g. the electrical power that is supplied to the store from the power grid). In an alternative embodiment, it is possible for the moving display system 10 to include a different arrangement for supplying power to the display member support 18 than that shown in FIG. 1. For example, the moving display system 10 could optionally include a photovoltaic panel (not shown) to generate electrical power, which is stored in a charging station energy storage device (not shown). The charging station 60 could still be connected to the in-store power supply, but could be programmed only to draw power from it when there is no charge remaining in its own energy storage device. This would reduce the operating costs associated with the moving display system 10.

Figure 4:
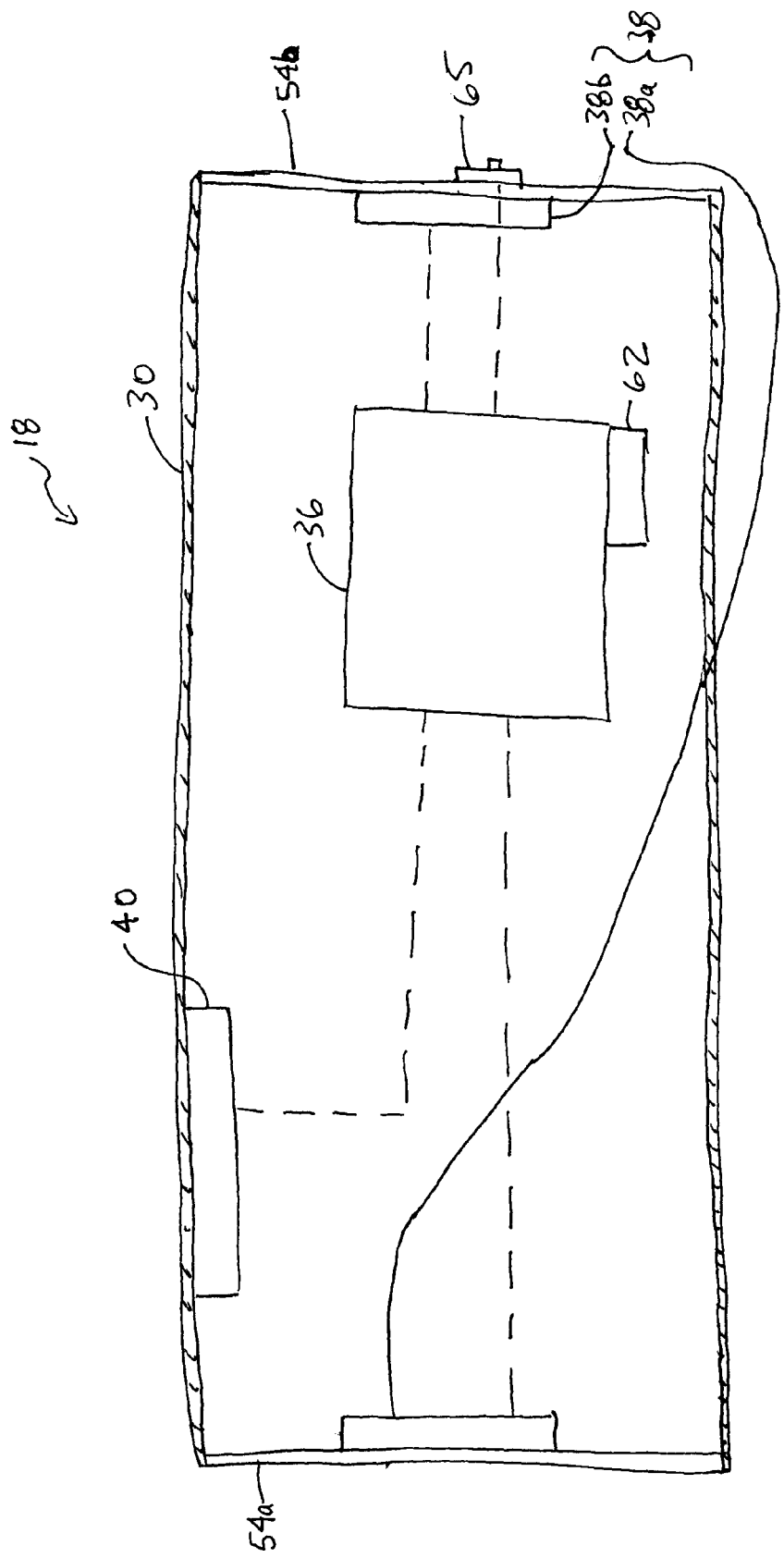
FIG. 4 is a sectional plan view of a the display member support shown in FIG. 2.

In an embodiment, as shown in FIG. 4, the display member support 18 includes a master switch 65 that is used to manually turn on and off the display member support 18.

In yet another embodiment, the display member support 18 may be a first display member support 18a and the moving display system 10 may include additional powered display member supports, as shown at 18a, 18b and 18c in FIG. 5. In the embodiment shown in FIG. 5, each display member support 18 may be equipped identically. It can be seen in FIG. 5a, that only the first display member support 18a can connect directly to the charging station 60. In order to permit all the display member supports 18 to be charged, each display member support 18 may include a secondary connector 66 on its other longitudinal end, which is electrically connected to the primary connector 56 on the first longitudinal end (which is the end that faces the charging station 60). Thus, when the first display member support 18a plugs into the charging station 60, the second display member support 18b can plug its primary connector 56 into the secondary connector 66 of the first display member support 18a. Similarly, the third display member support 18c can plug its primary connector 56 into the secondary connector 58 of the second display member support 18b, and so on. In this way, all the display member supports 18 can be connected to the charging station 60. Preferably, the connections are in parallel so that if there is a problem with the controller 36 or the energy storage device 40 of one of the display member supports 18 the other display member supports 18 can still recharge.

Reference is made to FIG. 6, which shows an alternative track structure 100 that can be used as part of the moving display system 10 instead of the track structure 13. The track structure 100 includes first and second posts 102 shown individually at 102a and 102b. Each post 102 has a mounting end 104, (which may be referred to as a post mounting end), and a free end 106 (which may be referred to as a post free end). At the post mounting end 104, the post 102 may have a magnet 108 (which may be referred to as a post magnet) which holds the post 102 to a metal support member (shown at 110), such as a steel joist from the building or structure in which the moving display system 10 is to be installed. The first and second posts 102 are positioned a selected distance apart from each other. A cable 112 has a first end 114a and a second end 114b, and has a magnet 116 (which may be referred to as a cable magnet) that holds the end 114a or 114b of the cable 112 to the metal support member 110. The cable 112 extends from its two ends 114a and 114b (which may be referred to as cable mounting ends 114a and 114b) to the free ends 106 of the posts 102 and then across the distance between the two posts 102. The posts 102 may have slots 118 at their free ends 106 for capturing the cable 112 to ensure that the cable 112 does not come off the posts 102 inadvertently. The cable magnets 116 are sufficiently strong that the span of cable 112 between the posts 102 can be made taut. It is this span, which is shown at 120 that constitutes the track member. The other spans of cable, shown at 122 (122a and 122b individually), together with the posts 102, make up the track member support. A charging station 124 may be mounted to the free end 106 of one of the posts 102, and may be plugged in to a power source such as an electrical outlet from the building in which the moving display system 10 is being installed. The charging station 124 may be connected to by the display member support 18 in similar manner to the charging station 60.

In an alternative embodiment the cable 112 may be replaced with three separate cables, each corresponding to one of the aforementioned spans 120 and 122.

The track structure 100 is advantageous in situations where it is desirable to set up the moving display system 10 on a temporary basis, such as for use at a trade show. The track structure 100 can be installed quickly, and can be torn down quickly. Additionally, in its torn down state, the track structure 100 occupies a very small volume and is easily transported from location to location.

While the moving display system 10 may be used for advertising purposes, as shown in the example in FIG. 1, it is alternatively or additionally possible to use the moving display system 10 for the purpose of communicating information to passersby, such as information regarding store hours, information regarding which check-out line is open, information regarding the nearest exit in an emergency, the location of certain points of interest in the store such as washrooms, a bank machine or the like. The moving display system 10 may be situated in places other than a store, such as for example, in a mall, at a trade show, at an event such as a fair, or other locations.

In particular, by providing the display member support with only two wheels that are substantially in-line with each other, with an on-board energy storage device, and with two proximity sensors, preferably but not necessarily non-contact sensors, each configured for detecting one end of the track member, the display member support may be made lightweight, reliable, while being inexpensive and while using very simple programming.

While the above description constitutes a plurality of embodiments of the present invention, it will be appreciated that the present invention is susceptible to further modification and change without departing from the fair meaning of the accompanying claims.

The invention claimed is:

1. A moving display system, comprising:
    a track member support;
        a track member held by the track member support, and having a first end and a second end;
        a display member support, including
            a body, wherein the body is configured to hold a display member,
            a motor,
            a wheel, wherein the wheel is drivable by the motor to move the display member support along the track member,
            a sensing system including a first sensor for detecting the first end of the track member and a second sensor for detecting the second end of the track member,
            an energy storage device for powering the controller and the motor, and
            a controller that is operatively connected to the motor, wherein the controller receives signals from the sensing system, and wherein when the controller determines that the energy storage device has more than a selected amount of charge, the controller is programmed to:
                a) determine using the signals when the display member support reaches one of the first and second ends of the track member, and
                b) change the direction of rotation of the motor based on the determination made in step a),
            and when the controller determines that the energy storage device has less than the selected amount of charge, the controller is programmed to drive the display member support to a charging station and charge the energy storage device by connecting the energy storage device to an external source of power.

2. A moving display system as claimed in claim 1, wherein the sensing system includes a first sensor at a first longitudinal end of the display member support and a second sensor at a second longitudinal end of the display member support.

3. A moving display system as claimed in claim 1, wherein the wheel is a first wheel and wherein the display support member further includes a second wheel that is substantially in-line with the first wheel and wherein the display support member has a center of gravity that is below the first and second wheels.

4. A moving display system as claimed in claim 1, wherein the display support member has a longitudinal slot that passes all the way therethrough longitudinally, wherein the longitudinal slot defines a generally laterally extending installation path for the track member when mounting the display support member on the track member, wherein the installation path extends from an opening in the exterior of the body to an endpoint on an underside of the wheel, and wherein the installation path includes at least one vertical drop and one vertical rise in the direction of travel of the track member to the endpoint.

5. A moving display system as claimed in claim 1, wherein the display member is an electronic display.

6. A moving display system as claimed in claim 5, wherein the display member support includes a wireless communication device and wherein the controller is programmed to receive commands from a remote device and to change media displayed on the electronic display based on the commands.

7. A moving display system as claimed in claim 6, wherein the wireless communication device includes a cellular communication device.

8. A moving display system as claimed in claim 1, wherein the display member support includes a wireless communication device and wherein the controller is programmed to notify a remote device when the display member support requires servicing.

9. A moving display system as claimed in claim 8, wherein the wireless communication device includes a cellular communication device.

10. A moving display system as claimed in claim 1, wherein the track member support structure includes a first post and a second post, wherein each post has a post mounting end and a post free end, and include a post magnet at the post mounting end, and wherein for each post a first cable span extends from a cable mounting end to the post free end and has a cable magnet at the cable mounting end, and wherein the track member extends between the free ends of the posts.

11. A moving display system as claimed in claim 10, wherein the track member and the first cable spans are contiguous with one another.

12. A moving display system as claimed in claim 10, wherein the controller is programmed to determine the charge level in the energy storage device based on a distance traveled by the display member support.

13. A moving display system as claimed in claim 10, wherein the controller is programmed to reciprocate the motor at a sufficiently high frequency to cause the display member to shake.

14. A moving display system as claimed in claim 1, wherein the charging station contains a first induction coil connected to an external power source and the moving display support contains a second induction coil connected to the energy storage member, and wherein the charging station charges the energy storage member when the first and second induction coils are brought into sufficient proximity to each other.

15. A moving display system as claimed in claim 1, wherein the track member is a cable.

* * * * *